May 27, 1941.   J. A. HONEGGER   2,243,754
CAPSULE OR CONTAINER FOR HIGHLY COMPRESSED FLUID MEDIA
Filed May 14, 1938
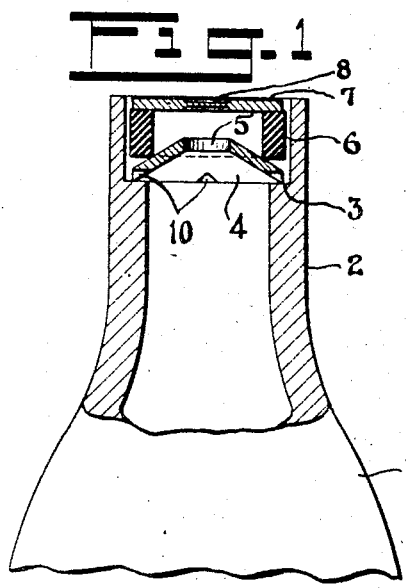
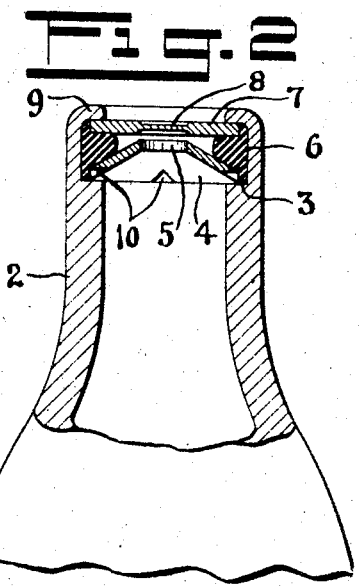
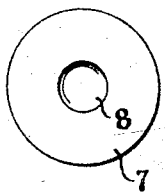
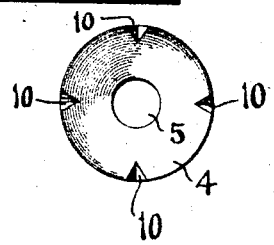
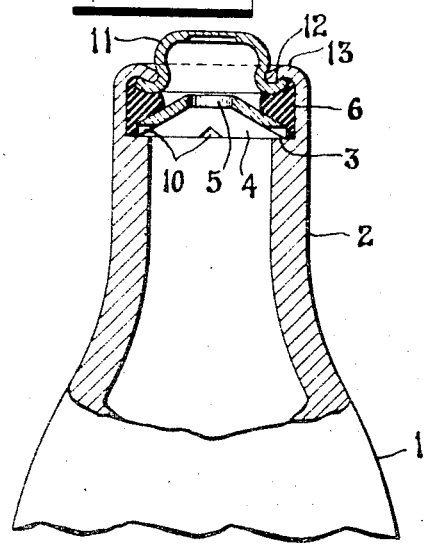
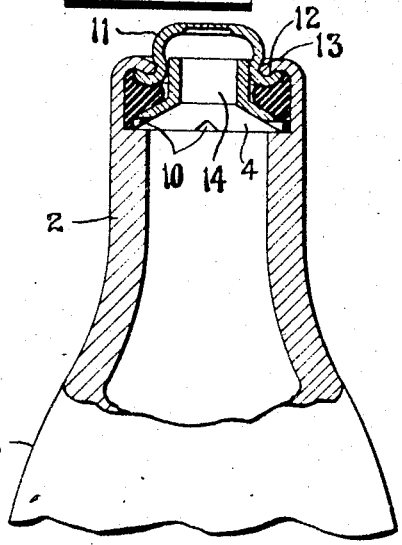
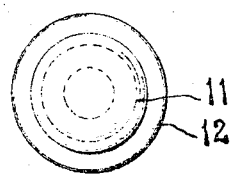
INVENTOR.
John A. Honegger
BY
J. William Carson
ATTORNEY.

Patented May 27, 1941

2,243,754

UNITED STATES PATENT OFFICE 2,243,754

CAPSULE OR CONTAINER FOR HIGHLY COMPRESSED FLUID MEDIA

John A. Honegger, Bloomfield, N. J., assignor to Specialties Development Corporation, Bloomfield, N. J., a corporation of New Jersey Application May 14, 1938, Serial No. 207,875

1 Claim. (Cl. 220—46)

The present invention relates to a modified form of the container or capsule shown and described in my co-pending application for Letters Patent of the United States Serial No. 193,253, filed March 1, 1938.

This invention will accordingly be found to have reference to closures for metallic capsules designed to hold compressed or liquefied gases such as are used for aerating or carbonating beverages, and which are often stored for long periods of time under such widely varying temperature conditions, that with the type of closures at present in general use they have been subject to appreciable leakage and sometimes total loss of the gas charge. The usual method of closing these capsules has been to employ a simple form of metallic cap inserted into a counterbored open end of the neck of the capsule to rest on a shoulder formed therein, a rubber washer being placed over the peripheral edge of the cap as a sealing gasket, and the end wall of the counterbored neck being bent over, after completion of the filling operation, to compress the washer and hold the cap in place. In such a procedure, however, there are too many variables to assure uniform leakage proof closing of the capsules, especially in view of the unpredictable shape into which the rubber washer would be pressed, the final shape and position of which is of prime importance in overcoming leakage of the high pressure fluid charge. This problem has been solved by the present invention by controlling the pressure acting on the rubber washer and by providing a closure which substantially confines the washer and wedges it into cooperation with the container wall upon the bending over of a portion of the container to engage a closure piece, so that the rubber washer effectively seals every path of escape of the fluid medium.

It is therefore an object of this invention to provide a closure for high pressure medium containers that is substantially leakage proof.

Still another object is to provide a closure that will result in definite compressive confinement of the sealing means.

It is another object to provide a closure which is economical in manufacture and application.

A still further object is to provide a closure which may be easily pierced to effect liberation of the medium thereby confined.

In the accompanying drawing, Figure 1 shows in section the upper portion of a container or capsule, before being closed in accordance with this invention; Figure 2 is the container of Figure 1 shown when it has been closed; while Figures 3 and 4 show in top and bottom plan view respectively the closure and the conical washer used in closing the capsule.

Figures 5 and 6 represent variations of the closure of Figure 1 after closing, using other types of top piece and conical washer respectively, while Figure 7 is a top plan view of this cap-like top piece.

In Figure 1, the container or capsule 1 is formed with a neck portion 2 counterbored at its upper end to form an internal shoulder 3, which supports a conical metallic washer 4 having an opening 5 through its apex. A circular rubber gasket or washer 6 rests on the conical washer 4 and in turn supports the flat circular top piece 7, which is centrally coined as at 8, so as to facilitate piercing of the cap when the discharge of the confined gas is desired. Figure 1 also represents the position of the closure elements during the filling of the capsule, space being left between the various elements to permit the passage of gas during the filling operation, upon completion of which the capsule is closed by crimping the open end of the neck over the edge of the top piece 7. The result of this operation is illustrated in Figure 2, the edge of the open neck having been crimped as shown at 9 over the edge of the top closure to form an interlocking union therewith in direct metal to metal contact. The rubber gasket 6 is here seen to have been compressed to about half its original height, there being no extrusion of the rubber sideways toward the center of the washer, as the frusto-conical washer at each section of the gasket acts as wedge, the resulting force on the rubber section being vertical to the conical slope and acting upwardly and outwardly, thus helping to compress the rubber outwardly. The high gaseous pressure prevailing in the capsule, of course, is of material assistance in accomplishing the result finally shown in Figure 2. It will be seen that all these factors go to make up a most effective leakage proof seal.

Figure 3, in a top plan view, shows the shape of the closure top piece 7; while Figure 4 is a bottom plan view of the metallic frusto-conical washer referred to above, showing at 10 notches provided in its peripheral edge to permit the passage of gas into the container while in the position as shown in Figure 1.

In Figure 5 is shown a variation of the closure of Figure 1, in which a cap-like top piece 11 is used, which has an upturned flange 12, which as is sometimes desirable provides a more secure interlock with the crimped neck edge, as indicated at 13.

Figure 6 is a construction similar to that of Figure 5 with the exception that a short tubular formation 14 has been added to the frusto-conical washer of Figures 1, 2 and 5, the purpose of this formation being to better direct the escape of gas when the top piece has been punctured, and to somewhat improve the sealing properties of the whole combination. The sealing principle, however, is the same throughout the various forms, namely, the compressive confinement of the rubber washer between the cuneiform bottom piece, the neck wall and the peripheral edge or flange of the top piece, the side thereof being supplied by the wedging action of the bottom washer.

Figure 7 is a top plan view of the top closure pieces of Figures 5 and 6, in which gas passages in the form of peripheral notches in the frusto-conical washer are provided as before.

It will be observed that in each of the embodiments of the invention shown in the drawing the closure is so constructed as to wedge the sealing means into cooperation with the container wall upon the bending over of a portion of the container to engage the top piece and compress the sealing means. With this construction the sealing means effectively seals every path of escape of the fluid medium.

From the foregoing description, it will be seen that I have provided an improved means to seal a high pressure fluid medium in a container of the type described which is simple and effective, providing as it does a substantially leakage proof seal. It will be further seen that my invention accomplishes the various objects pointed out at the beginning of this specification. Finally, while my invention resides in certain principles of construction and operation which have been illustrated and described in connection with the accompanying drawing, it will be apparent to those skilled in the art that the invention may be embodied in other forms of construction without departing in any manner from the spirit and scope of the invention, and I therefore do not wish to be strictly limited to the disclosure, but rather to the scope of the appended claim.

I claim:

In a container for holding a highly compressed fluid medium having a pliable neck forming an inwardly projecting shoulder, sealing means having a central opening disposed in said neck and exposed to the pressure of the fluid medium in the container, imperforate closure means for said container supported by said sealing means and adapted to interlock with a portion of the neck, and means supported by said shoulder adapted to support said sealing means, the upper surface of said last named means sloping downwardly from the center to the outer periphery thereof, the peripheral edge of said last named means which is in contact with said shoulder being notched to provide passage means to aid in the filling of said container, a portion of said neck being bent inwardly upon said closure, whereby the sealing means is acted on by a wedging force on the part of the last named means and compressibly confined substantially from all sides into sealing relationship with said closure, said neck, and said passage means, due to coaction between said wedging means, said closure means, said shoulder, said neck, and the internal fluid pressure.

JOHN A. HONEGGER.